Patented July 28, 1953

2,646,608

UNITED STATES PATENT OFFICE 2,646,608

PROCESS OF MANUFACTURING A MAGNETIC MATERIAL

Jan Boeke, Eindhoven, Netherlands, assignor, by mesne assignments, to Hartford National Bank and Trust Company, Hartford, Conn., as trustee No Drawing. Application April 8, 1946, Serial No. 660,421. In the Netherlands February 25, 1943

3 Claims. (Cl. 25—156)

It is known to utilize ferro-magnetic ferrites as the magnetic material for a magnetic core, which ferrites are manufactured by sintering together a mixture of ferrite-forming constituents which contains an iron compound and one or more further metal compounds, for example a mechanical mixture of oxides, in which event instead of oxides use may alternatively be made of compounds which change to oxides upon heating (Conf. German patent specifications 226,346 and 227,787). If in this case care is taken that the ferrite has a sufficiently high content of oxygen it is possible to obtain magnetic materials of very low total losses (Conf. French patent specification 887,083). With a sufficiently large permeability ferrites can be obtained for which the value of the quotient of $\tan \delta/\mu$ is less than about $10^{-4}$ for frequencies greater than about 100 kc./sec. and less than about 1000 kc./sec. where $\delta$ is the phase angle of the current flowing in an inductance coil wound on an annular core comprising the ferrite material and $\mu$ is the permeability of the core. Cores of this kind are important for radio purposes, for example for slidable-core coils. Highly valuable magnetic materials may also be made in the said manner for telephony and telegraphy, for example for pupin coils and for filter coils.

According to the invention, the ferrite is prepared by mechanically mixing ferrite-forming initial constituents containing active iron oxides and other metal compounds and sintering the mixture.

The active iron oxide is for example, a ferric oxide which has a greater reactivity than the so-called inactive oxide which is formed when the active oxide is heated for a considerable period of time at a temperature in the neighborhood of 1000° C. Such oxides are well known for their catalytic properties and in general exhibit far greater activity chemically than the corresponding inactive oxide. Active oxides also exhibit a higher energy content which manifests itself inter alia in an increased heat of solution. Such active oxides can be prepared in numerous ways which are well-known.

The use of active oxides in the preparation of ferrites according to the invention offers many advantages which are important for the magnetic properties of the ferrite obtained. In this connection it is observed that it appeared to our surprise that for obtaining these advantages it suffices in practice if out of the reacting ferrite-forming initial constituents only the iron oxide is in the active state. This does not, however, exclude the possibility to utilize in the active state also the metal compounds reacting with the iron oxide.

It is known to prepare a ferrite by depositing a solution of the salts of the metal constituents of a ferrite by the addition of a base, for example of alkali, and by sintering the deposit produced, which may already exhibit in part the structure of a ferrite. Such a mixture of oxides which has not been obtained, however, by mechanical mixing contains active oxides. The ferrites thus obtained exhibit, however, highly different qualities which cannot be controlled so that the method is useless for the manufacture of ferrites for technical purposes, in which event definite constant properties are aimed at and, consequently, reproducible working is of primary importance.

Now, by utilising the invention, the advantages inherent to the use of active oxides are obtained without being hampered by insufficient reproducibility.

Even as compared with the process by which a mechanical mixture of ordinary oxides or of other metal compounds is sintered the use of the invention leads to results that can be reproduced more easily, since it has been found that when a ferrite-forming mixture is sintered at a temperature at which sintering to compactness does not yet occur, small differences in the conditions of sintering, notably in the sintering temperature, may in many cases lead to troublesome differences in the magnetic properties of the ferrite obtained. When using the invention the properties of the ferrites obtained are less sensitive to such differences in the conditions of sintering.

Another important advantage offered by the use of active iron oxide consists in the possibility of obtaining, by sintering at comparatively low temperatures, ferrites having an initial permeability higher than when use is made of non-active iron oxide. This higher permeability is to be attributed not only to a thorough reaction but probably to a more uniform contraction in sintering active oxides, owing to which so-called air-gaps between the grains of ferrite sintered together, which detrimentally affect the permeability, have less effect.

With respect to the use of mixtures of oxide deposited by wet means, the use of active iron oxide, according to the invention, offers the additional advantage that it is possible to obtain the mixture free from alkali constituents. It has been found as a remarkable fact in the invention that such a content of alkali is highly detrimental to the permeability. For depositing such a mixture of oxides by wet means the use of alkali is usually necessary, however, and this alkali can be removed from the deposit only with great difficulty. Since active iron oxide can be readily obtained free from alkali, this drawback does not occur in the invention.

According to one particular embodiment of the invention, the active iron oxide used is an oxide obtained by wet means, for example by depositing a solution of iron salt with ammonium hydroxide and by dehydrating the produced deposit at low temperature. The ferrites obtained with such an oxide have a high permeability as well as a high fineness of grain. As is well known from French patent specification 887,083, such a fineness of grain is very important with a view to obtaining low losses.

Another advantageous method for preparing active oxides is by topochemical reaction. By topochemical reaction is meant treating the salt of metal for which the active oxide is desired in the solid state with a wet reagent so that the surface reaction takes place yielding the active oxide or oxide hydrate without first dissolving the salt. For example, active ferric oxide can be obtained directly by treating a ferric salt such as ferric sulphate with a base such as ammonium hydroxide, in which case active ferric hydroxide is obtained. The hydroxide can be heated to convert it into the active oxide.

Active iron oxides are distinguished from non-active oxides by their colour. The darker the colour, the less active is the oxide. Orange iron-oxide is very active. According to the invention use is preferably made of an iron oxide coloured from bordeaux red to orange.

*Example*

Active ferric oxide is obtained by depositing a solution of ferric chloride with ammonium hydroxide and drying the deposit at about 105° C. The ferric oxide, together with pure cupric oxide and pure zinc oxide in a molecular ratio of 50:20:30, is ground in an iron ball-mill for half an hour. From the mixture is moulded a ring under a pressure of 4 tons/cm². The ring obtained is sintered in oxygen at 950° C. for three hours and is then slowly cooled down to 725° C. This temperature is maintained for 24 hours and at last another slow cooling takes place, all this in oxygen. The permeability of the obtained ring of copper- and zinc-ferrite amounted to 310. The loss factor $tg\delta$ amounted to 5.2% at 1000 kilocycles/sec.

What I claim is:

1. The method of manufacturing magnetic material, comprising the steps of treating ferric chloride with ammonium hydroxide, precipitating ferric oxy-hydrate out of solution, converting said ferric oxy-hydrate into active ferric oxide, mixing said active ferric oxide with pure copper oxide and pure zinc oxide, sintering the mixture thus obtained at temperature of about 950° for about three hours, slowly cooling said heated mixture to approximately 725° C., maintaining said sintered mixture for approximately 24 hours at a temperature of 725° C., and slowly cooling the sintered mixture to the ambient temperature.

2. The method of manufacturing magnetic core material, comprising the steps of treating ferric chloride with ammonium hydroxide, precipitating ferric hydroxide out of solution, converting said ferric hydroxide into active ferric oxide, mixing said active ferric oxide with pure copper oxide and pure zinc oxide in a molecular ratio of 50:20:30, pulverizing said mixture, compressing the mixture under a pressure of approximately 4 tons/cm.² to form a core, heating said core in an atmosphere of oxygen for approximately three hours at a temperature of about 950°, slowly cooling said core in an atmosphere of oxygen to a temperature of about 725° C., maintaining said core at a temperature of about 725° C. in an oxygen atmosphere for about 24 hours, and slowly cooling said core in an oxygen atmosphere to the ambient temperature.

3. A method of manufacturing a magnetic material, comprising the steps of reacting a water-soluble inorganic ferric salt with ammonium hydroxide to produce an alkali-free ferric oxyhydrate, dehydrating the alkali-free oxyhydrate to convert the latter to an active ferric oxide, intimately mixing the active ferric oxide thus obtained with ferrite-forming constituents, and sintering the mixture thus obtained at an elevated temperature between 950 and 1000° C. to produce a magnetic ferrite material.

JAN BOEKE.

References Cited in the file of this patent

UNITED STATES PATENTS

| Number | Name | Date |
|---|---|---|
| 1,946,964 | Cobb | Feb. 13, 1934 |
| 1,976,230 | Kato | Oct. 9, 1934 |
| 1,997,193 | Kato | Apr. 9, 1935 |
| 2,452,529 | Snoek | Oct. 29, 1948 |
| 2,452,530 | Snoek | Oct. 30, 1948 |
| 2,452,531 | Snoek | Oct. 30, 1948 |